United States Patent [19]

Sivulka et al.

[11] Patent Number: 4,976,501
[45] Date of Patent: Dec. 11, 1990

[54] FLUID ACCUMULATOR FOR USE IN A VEHICLE ANTI-LOCK BRAKE SYSTEM

[75] Inventors: Gerald M. Sivulka, Ann Arbor; Peter Every, Livonia, both of Mich.

[73] Assignee: Kelsey-Hayes Company, Ann Arbor, Mich.

[21] Appl. No.: 387,470

[22] Filed: Jul. 31, 1989

Related U.S. Application Data

[63] Continuation-in-part of Ser. No. 283,689, Dec. 13, 1988, Pat. No. 4,865,399, which is a continuation-in-part of Ser. No. 53,221, May 22, 1987, Pat. No. 4,828,335, which is a continuation-in-part of Ser. No. 764,162, Aug. 9, 1985, Pat. No. 4,668,023, which is a continuation-in-part of Ser. No. 702,765, Feb. 19, 1985, Pat. No. 4,673,226.

[51] Int. Cl.$^5$ .............................................. B60T 8/32
[52] U.S. Cl. ..................................... 303/113; 303/119; 303/100; 303/DIG. 4; 188/181 R
[58] Field of Search ................... 303/113–119, 303/61–63, 68–69, 110, 10, 100, 92, DIG. 1–4; 180/197, 233, 244; 188/181

[56] References Cited

U.S. PATENT DOCUMENTS

| | | | |
|---|---|---|---|
| 3,414,336 | 12/1968 | Atkin et al. | 303/115 |
| 3,521,934 | 7/1970 | Leiber | 303/119 |
| 3,524,684 | 8/1970 | Skoyles | 303/116 |
| 3,532,391 | 10/1970 | Klein | 303/119 |
| 3,574,416 | 4/1971 | Skoyles | 303/116 |
| 3,639,009 | 2/1972 | Klein et al. | 303/119 |
| 3,645,584 | 2/1972 | Leiber et al. | 303/119 X |
| 3,677,608 | 7/1972 | Lewis | 303/115 |
| 3,690,736 | 9/1972 | Smirl et al. | 303/115 |
| 3,715,145 | 2/1973 | Harned et al. | 303/116 |
| 3,756,666 | 9/1973 | Leiber | 303/116 X |
| 4,418,966 | 12/1983 | Hattwig | 303/100 |
| 4,453,782 | 6/1984 | Arikawa et al. | 303/119 X |
| 4,480,877 | 11/1984 | Resch | 303/61 X |
| 4,509,802 | 4/1985 | Solleder et al. | 303/110 |
| 4,597,611 | 7/1986 | Nishimura et al. | 303/116 |
| 4,668,023 | 5/1987 | Every et al. | 303/100 |
| 4,673,226 | 6/1987 | Every et al. | 303/109 X |
| 4,765,691 | 8/1988 | Inoue et al. | 303/119 X |
| 4,779,936 | 10/1988 | Farr | 303/116 |
| 4,790,607 | 12/1988 | Atkins | 303/61 X |
| 4,799,048 | 1/1989 | Goshima et al. | 303/115 X |
| 4,828,335 | 5/1989 | Fuller et al. | 303/119 X |
| 4,844,558 | 7/1989 | Ishii et al. | 303/119 |
| 4,865,399 | 9/1989 | Atkins et al. | 303/119 X |

Primary Examiner—Douglas C. Butler
Attorney, Agent, or Firm—MacMillan, Sobanski & Todd

[57] ABSTRACT

An accumulator assembly for a vehicle anti-lock brake system receives and temporarily stores fluid during pressure reduction phases of the anti-lock operation, and maintains fluid stored therein substantially at or near zero pressure during anti-lock operation. The accumulator enables the fluid pressure to the controlled brakes to be reduced to substantially near zero pressure. The accumulator is further operative, after braking of the vehicle, to apply a predetermined pressure above zero pressure to the brake fluid stored therein to enable the fluid to be returned to the brake system. The accumulator is advantageously used in a pumpless anti-lock system which is operative to control the rear disc brakes of a light pick-up truck.

18 Claims, 3 Drawing Sheets

FLUID ACCUMULATOR FOR USE IN A VEHICLE ANTI-LOCK BRAKE SYSTEM

CROSS REFERENCE TO RELATED APPLICATIONS

This application is a continuation-in-part of copending application, U.S. patent application Ser. No. 07/283,689, filed Dec. 13, 1988, now U.S. Pat. No. 4,865,399 which is a continuation-in-part of U.S. patent application Ser. No. 07/053,221, filed May 22, 1987, now U.S. Pat. No. 4,828,335, which is a continuation-in-part of U.S. patent application Ser. No. 06/764,162, filed Aug. 9, 1985, now U.S. Pat. No. 4,668,023, which is a continuation-in-part of U.S. patent application Ser. No. 06/702,765, filed Feb. 19, 1985, now U.S. Pat. No. 4,673,226.

BACKGROUND OF THE INVENTION

The present invention relates generally to vehicle anti-lock brake systems and, more particularly, to a low pressure accumulator assembly for such a system wherein the accumulator is adapted to receive and temporarily store fluid during pressure reduction phases of the anti-lock control operation.

Braking a vehicle in a controlled manner under adverse conditions such as rain, snow, or ice generally requires precise application of the brakes by the vehicle driver. Under these conditions, or in panic stop situations, a driver will often apply excessive brake pressure, thus causing the wheels to lock such that excessive slippage between the wheels and the road surface takes place. Wheel lockup conditions can lead to loss of directional stability and, possibly, uncontrolled vehicle spin-out.

In a continuing effort to improve the operational safety of vehicles, many companies have been involved in the development of anti-lock braking systems. While typically such systems are adapted to control the braking of each braked wheel of a vehicle, some systems have been developed for controlling the braking of only a portion of the braked wheels. Examples of prior art anti-lock brake systems are disclosed in U.S. Pat. Nos. 3,515,440; 3,731,979; 3,870,376; and 3,880,474.

Generally, prior art anti-lock brake systems include a central control unit for monitoring the speed of the controlled wheels to determine the deceleration of the controlled wheels. When the brakes of the vehicle are applied and the wheel deceleration of the monitored wheels exceeds a predetermined deceleration threshold, indicating that there is wheel slippage and the wheels are approaching a lockup condition, the central control unit functions to control the application of hydraulic pressure through a control valve means to the associated brakes to prevent lockup of the controlled wheels. Typically, the anti-lock brake system includes means for cyclically reducing and reapplying pressure to the associated brakes to limit wheel slippage to a safe level while continuing to produce adequate brake torque to decelerate the vehicle as desired by the driver. While some systems utilize a separate hydraulic pump as the means for reapplying pressure, other systems, such as disclosed in U.S. Pat. No. 4,418,966, do not require the use of a separate hydraulic pump.

In controlling the application of pressure to selected wheel brakes, many systems utilize a low pressure accumulator which is operative to temporarily receive and store brake fluid during pressure reduction phases of the anti-lock operation. The low pressure accumulator typically maintains fluid stored therein at a predetermined minimum pressure determined by a compression spring acting on an accumulator piston, generally in the range of 30-60 p.s.i. This minimum pressure represents the lowest pressure to which the controlled brakes can be reduced during anti-lock operation. However, it has been found that, in certain braking situations, it is necessary to reduce the controlled pressure below this minimum pressure in order to achieve the desired control.

SUMMARY OF THE INVENTION

The present invention concerns a unique accumulator assembly for a vehicle anti-lock brake system which receives brake fluid during pressure reduction phases of the anti-lock operation, and maintains brake fluid stored therein at or near zero pressure. Thus, if necessary, fluid pressure to the controlled wheel brakes can be reduced to near zero pressure. Such low pressure reduction has been found to be desirable when attempting to free up a disc brake rear wheel of a light truck braking on a very low mu surface such as ice. In these situations, the natural drag provided by the continuous engagement of the disc brake pads and rotor require that pressure be reduced to near zero pressure in order to free up a locked rear wheel. The accumulator assembly of the present invention is capable of achieving such pressure reduction. In addition, the accumulator assembly includes means which, after braking of the vehicle, applies a predetermined pressure above zero pressure to the brake fluid stored therein to return the fluid to the brake system.

In the preferred embodiment of the invention, the accumulator assembly includes a piston slidably disposed within a housing and cooperating with the housing for defining a variable volume reservoir for receiving brake fluid during pressure reduction phases of the anti-lock operation. The piston is normally spring biased to a position wherein the reservoir is at a minimum volume. The accumulator assembly also includes an axially shiftable plunger which is coupled to compress the spring during anti-lock operation such that the spring exerts no force on the accumulator piston. The accumulator piston is then free to slide axially within the housing as fluid is introduced into the reservoir, and fluid is stored therein at essentially zero pressure. In the preferred embodiment of the invention, the plunger remains in the unactuated position until anti-lock operation has been initiated to reduce pressure, at which time it is hydraulically shifted by means of fluid pressure supplied by the vehicle master cylinder. When the brake pedal is released, the spring returns the plunger and piston to their initial positions, thus forcing the fluid in the accumulator reservoir back into the brake system.

The accumulator assembly of the present invention is especially useful in vehicle anti-lock brake systems which do not utilize a separate pump to apply additional pressure to the wheel brakes, such as the pumpless anti-lock system disclosed in U.S. Pat. No. 4,790,607. Other advantages of the invention will become readily apparent to one skilled in the art from reading the following description in conjunction with the attached drawings.

DESCRIPTION OF THE PREFERRED EMBODIMENT

Figure 1:
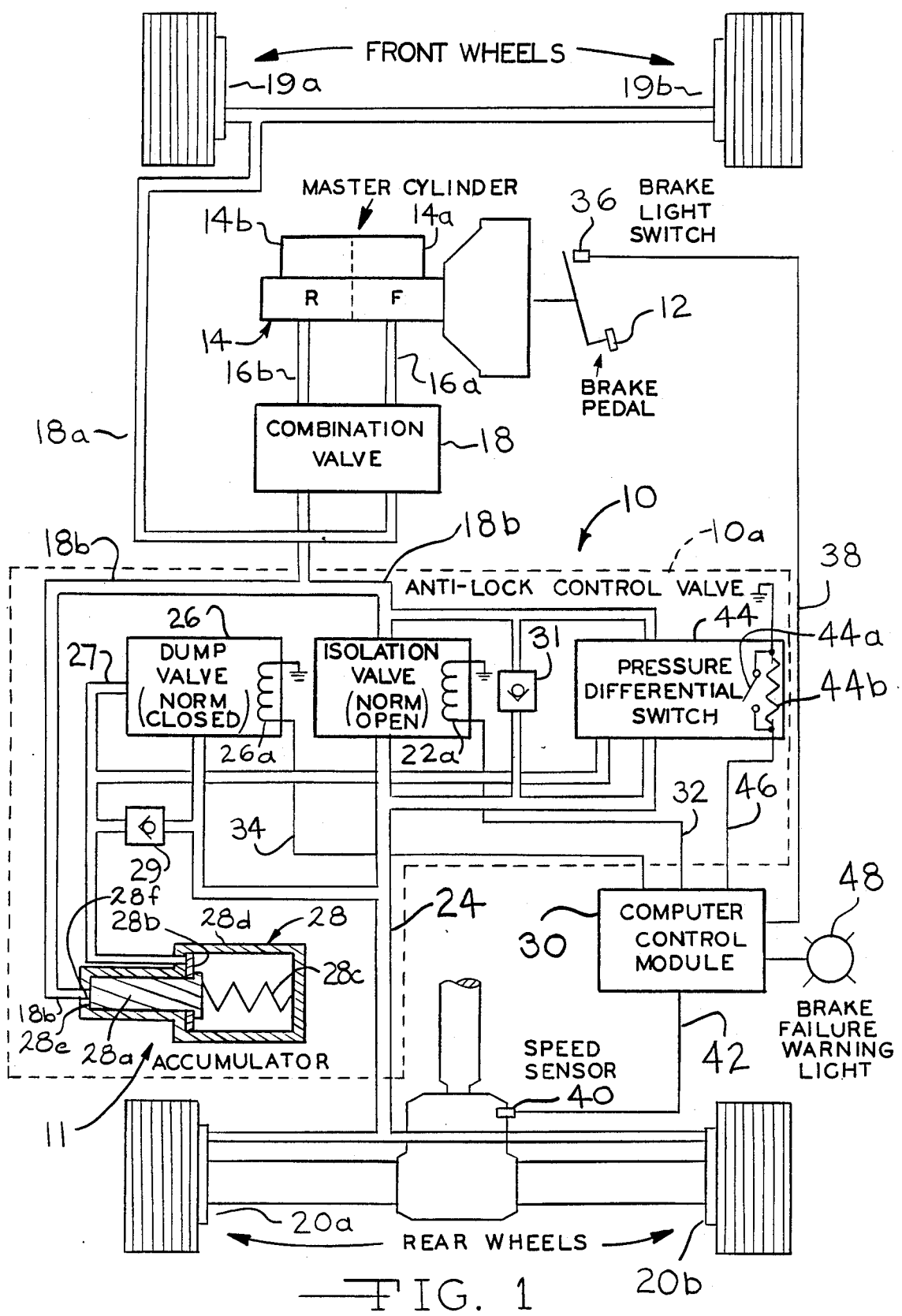
FIG. 1 is a schematic diagram illustrating a vehicle anti-lock brake system which utilizes the accumulator assembly of the present invention.

FIG. 1 illustrates a schematic diagram of a vehicle anti-lock brake system 10 including a control valve 10 which utilizes an accumulator assembly 11 constructed in accordance with the present invention. In particular, the control valve 10 includes those components located within the area defined by the dashed line 10a.

Prior to discussing the details of the accumulator assembly 11, the basic components and general operation of the anti-lock brake system will be briefly reviewed. A more detailed explanation of the control system and the control valve utilized therewith can be found in U.S. Pat. Nos. 4,673,226; 4,668,023; 4,790,607; and 4,828,235, and allowed U.S. patent application Ser. Nos. 07/283,360 and 07/283,689, all of which are herein incorporated by reference.

The anti-lock brake system illustrated in FIG. 1 is installed on a vehicle having a hydraulic braking system consisting of a brake pedal 12 coupled to operate a dual reservoir master cylinder 14. When the vehicle operator depresses the brake pedal 12 to brake the vehicle, the master cylinder 14 supplies pressurized hydraulic fluid from a front reservoir 14a through a hydraulic line 16a and from a rear reservoir 14b through a hydraulic line 16b to a conventional combination valve 18. The combination valve 18 includes a first output line 18a adapted to supply hydraulic fluid at a predetermined pressure to actuate the vehicle front brakes 19a and 19b and a second output line 18b which supplies fluid at a second predetermined pressure to actuate the vehicle rear brakes 20a and 20b. The combination valve 18 functions to maintain the fluid pressures to the front and rear brakes in approximate proportion to the weight distribution over the front and rear axles during braking of the vehicle.

The anti-lock control valve 10 is provided with a normally open isolation valve 22 connected between the line 18b and a line 24 which supplies pressurized fluid to the rear brakes 20a and 20b. The isolation valve 22 is solenoid-operated and is closed in the event an impending rear wheel lock up condition is detected. When closed, the valve 22 will hold the pressure in a line 24 at a relatively constant level and thus will prevent any further increase in pressure in the line 18b from being supplied to the line 24.

The anti-lock control valve 10 also includes a normally closed dump valve 26 connected between the line 24 and a line 27 which is connected to the accumulator assembly 11 of the present invention. The accumulator assembly 11 includes a variable volume fluid reservoir 28 for receiving fluid from the rear brake system during time periods when the rear brake pressure is reduced. In particular, when the isolation valve 22 has been closed and the pressure held in the line 24 continues to cause excessive slippage of the rear wheels, the dump valve 26 is selectively opened to direct fluid into the accumulator reservoir 28 to reduce the brake pressure in the line 24 and prevent lock up of the rear brakes. After the brake pedal 12 has been released, the isolation valve 22 is opened and the fluid in the accumulator reservoir 28 can be returned to the line 24 through a check valve 29.

A check valve 31 is connected across the isolation valve 22 between the lines 18b and 24 and provides for fluid flow from the line 24 to the line 18b when the pressure in the line 24 is greater than the pressure in the line 18b. Thus, when the brake pedal is released and the isolation valve is opened, higher pressure fluid in the line 24 can return to the line 18b through both the isolation valve 22 and the check valve 31.

The operation of the isolation valve 22 and the dump valve 26 is controlled by a computer control module 30. The isolation valve 22 and the dump valve 26 are solenoid operated valves having solenoids 22a and 26a which can be connected to the computer control module 30 by means of electric lines 32 and 34 respectively. In order to determine whether the vehicle operator is in the process of braking the vehicle, the computer control 30 is connected to a brake light switch 36 by a line 38 to monitor whether the brake pedal 12 is depressed. The computer control module 30 is also connected by a line 42 to a speed sensor 40 which monitors the average speed of the vehicle rear wheels by sensing the rotation of the rear differential ring gear (not shown). The computer control module 30 is further connected to a differential pressure switch 44 by a line 46. The differential switch 44 provides two separate functions. As discussed in detail in above-identified U.S. Pat. No. 4,828,335, when the system is in the anti-lock mode, the switch 44 is used to monitor the differential pressure across the isolation valve 22 in order to determine when it is desirable to release the anti-lock mode and return the braking system to the normal operating mode. Secondly, when the vehicle is not in the anti-lock mode and the vehicle is in the normal braking mode, the switch 44 is used to monitor the condition of the dump valve.

The operation of the anti-lock brake system illustrated in FIG. 1 will now be summarized. Basically, the system monitors the rear wheel speed and deceleration and, during braking of the vehicle, functions to control the application of hydraulic pressure to the vehicle rear brakes via the control valve 10 in order to prevent a lock up condition of the rear wheels. In the event a rear wheel slip condition is detected, indicating that the rear wheels are approaching a lock up condition, the control module 30 closes the isolation valve 22 to hold the pressure in the line 24 at its present value. If, after the isolation valve 22 has been closed, the rear wheel deceleration rate exceeds a predetermined amount, the dump valve 26 can be selectively opened to reduce pressure in the line 24 to prevent lock up of the rear wheels. When the dump valve 26 is selectively opened, fluid will be directed into the accumulator reservoir 28 via the line 27. In some instances, after pressure has been dumped to reduce rear wheel slip and correct an impending lock-up condition, it is desirable to re-apply additional pressure to the rear brakes to increase braking of the rear wheels. This is accomplished by momentarily opening the isolation valve 22 to permit the higher pressure fluid in the line 18b to be supplied to the line 24. The specific conditions under which additional pressure is reapplied to the rear brakes is discussed in detail in U.S. Pat. No. 4,790,607.

The present invention is specifically concerned with the construction of the accumulator assembly 11. In accordance with the present invention, during anti-lock operation, fluid supplied to the accumulator reservoir 28 will be maintained at or near zero pressure. In most prior art accumulators, the pressure is typically maintained at a pressure which is a function of the associated spring constant and is generally in the range of 30 to 60 psi. However, it has been discovered that, with certain braking systems and under certain braking conditions, it is sometimes desirable to reduce rear brake pressure to an amount less than 30 to 60 psi. For example, in vehicles such as light pick-up trucks wherein the rear wheels are provided with disc brakes, and the vehicle is stopping on a relatively low mu surface such as ice, it has been found that, in order to free up a rear wheel which has been locked under these conditions, the brake pressure to the rear wheel often must be reduced to near zero. With prior art accumulators, it is only possible to reduce the brake pressure to the level maintained by the associated spring.

The accumulator assembly 11 schematically shown in FIG. 1 is capable of maintaining brake fluid during anti-lock operation at or near zero pressure. As shown in FIG. 1, the accumulator assembly 11 includes an axially shiftable plunger 28a which is normally biased toward the left (as viewed in FIG. 1) by a compression spring 28c to force a slidable piston 28b toward an end wall of the accumulator housing 28d. In this position, the piston 28b and the housing 28d cooperate to define an accumulator reservoir at minimum volume. In accordance with the present invention, when the brake system enters the anti-lock mode and fluid is dumped into the accumulator reservoir 28, means are provided for shifting the plunger 28a toward the right (as viewed in FIG. 1) for compressing the spring 28c against the right wall of the housing 28d. In these instances, the plunger 28a will exert no axial force on the piston 28b and the piston will be free to shift axially toward the right to increase the volume of the accumulator reservoir 28 without exerting any substantial force on the fluid contained therein.

In the preferred embodiment of the invention, the plunger 28a is hydraulically shifted by means of master cylinder fluid pressure in the line 18b supplied to the accumulator assembly through an orifice 28f and adapted to exert a force on an end face 28e of the plunger 28a. During non braking conditions, the spring 28c urges the plunger 28a toward the left as shown in FIG. 1 such that end face 28e of the plunger 28a is seated against the end wall of the accumulator housing, and the piston 28b is urged toward the left to maintain the accumulator reservoir at minimum volume. When brake pressure is applied, the resultant axial force exerted on the plunger 28a will be a function of the area of the end face 28e exposed to the pressurized fluid. When the plunger 28a is in the position shown in FIG. 1, this area corresponds to the area of the orifice 28f. The size of the orifice 28f and the spring constant of the spring 28b are chosen such that, under non anti-lock braking conditions, the axial force exerted by the spring 28c is greater than the opposite hydraulic force, thus maintaining the plunger in the position as shown. However, when the system enters the anti-lock mode and fluid is initially dumped into the accumulator reservoir 28, the piston 28b and the plunger 28a will be forced to the right to partially compress the spring 28c, thus exposing the entire end face 28e of the plunger 28a to the fluid pressure in the line 18b. In these instances, the resultant hydraulic force is sufficient to compress the spring 28c such that the spring no longer exerts any force on the accumulator piston 28b. The accumulator piston will then be free to shift to the right to increase the volume of the accumulator reservoir 28 without exerting any pressure on the fluid stored therein. When the brakes are released, the spring 28c will urge the plunger 28a and the piston 28b back to their original positions, and will force any fluid in the accumulator reservoir 28 back into the rear brake line 24 through the check valve 29.

Figure 2:
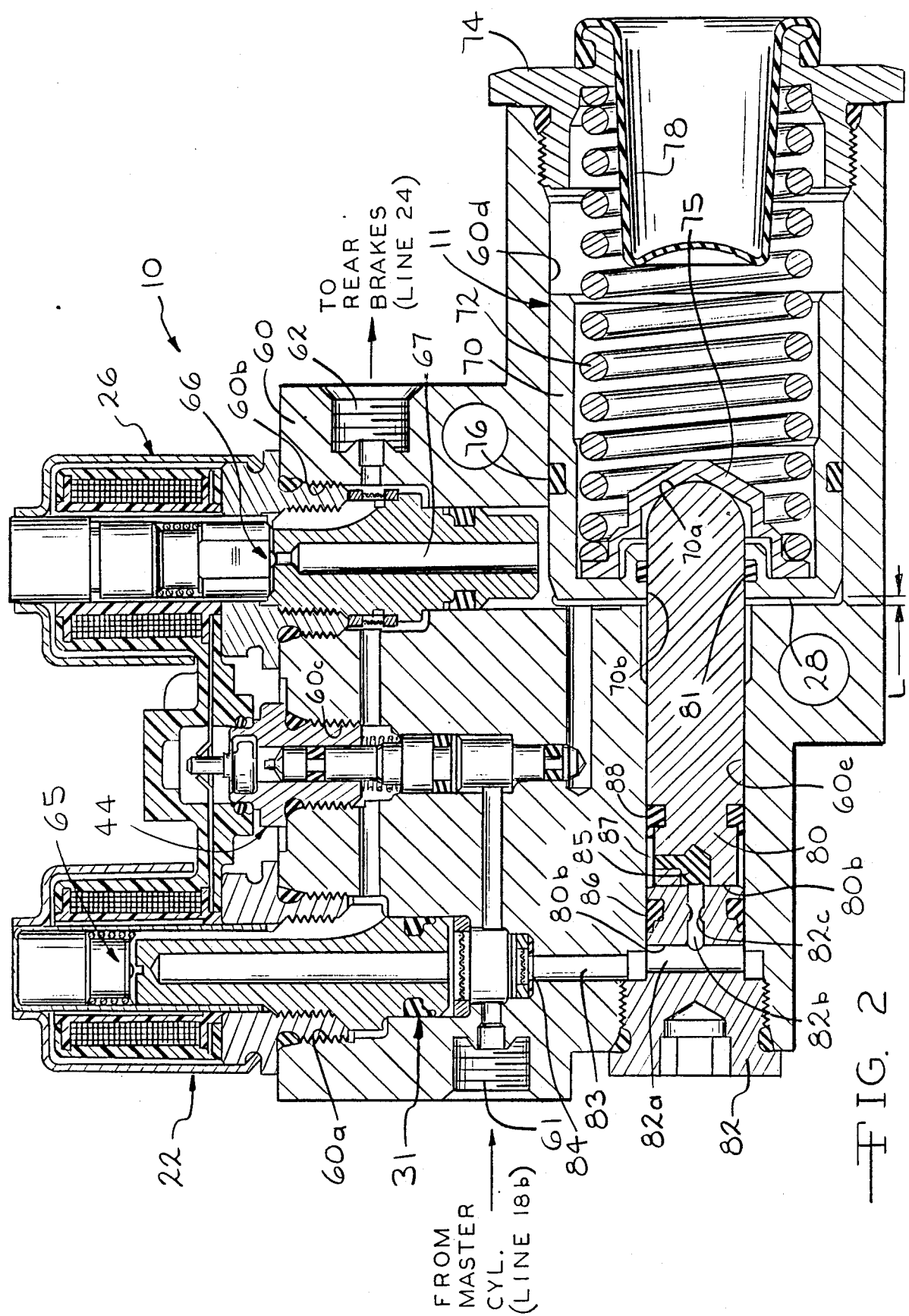
FIG. 2 is a sectional view of a control valve of the type schematically shown in FIG. 1, with the components of the accumulator shown in position prior to the introduction of any fluid into the accumulator reservoir.

Referring now to FIG. 2, the specific construction of the accumulator assembly 11 of the present invention will now be discussed in detail. FIG. 2 illustrates the control valve 10 having a structure which, except for the new accumulator design, is similar to the control valve described and illustrated in allowed U.S. Pat. No. 4,828,335. Thus, in the present application, while the overall structure of the valve will be briefly reviewed, only the accumulator assembly will be discussed in detail.

The valve 10 includes a one-piece valve body 60 having an inlet 61 adapted to be connected to the line 18b of FIG. 1 and an outlet 62 adapted to be connected to the line 24 of FIG. 1. The valve body 60 is provided with a plurality of internal openings formed therein for receiving various components of the valve. For example, an opening 60a is adapted to receive the isolation valve assembly 22, an opening 60b is adapted to receive the dump valve assembly 26, and an opening 60c is adapted to receive the differential switch assembly 44. The components of the accumulator assembly 11 are mounted within an opening 60d and a smaller opening 60e which is connected to the opening 60d.

The various components of the control valve are interconnected within the valve body 60 by a series of internally formed passageways, as discussed in detail in U.S. patent application Ser. No. 07/053,221. The isolation valve assembly 22 includes a normally open ball valve 65, while the dump valve assembly 26 includes a normally closed ball valve 66. Under non anti-lock conditions, brake fluid is supplied directly from the inlet 61 to the outlet 62 through a series of passageways as discussed in detail in U.S. Pat. No. 4,828,335. When the system enters the anti-lock mode, the isolation ball valve 65 is closed to block fluid flow between the inlet 61 and the outlet 62 and prevent any further increase in pressure to the rear brakes. Thereafter, if the system determines that pressure to the rear brakes should be reduced, the dump ball valve 66 can be selectively pulsed open to permit fluid to flow past the ball valve 66 downwardly through a central passageway 67 formed in the dump valve assembly and into the accumulator reservoir 28.

The preferred embodiment of the accumulator assembly 11, shown in FIG. 2, includes a generally cup-shaped slidable piston 70 (corresponding to the piston 28b of FIG. 1), a helical coil compression spring 72 (corresponding to spring 28c of FIG. 1), and an end plug 74. The piston 70 is slidably mounted within the cylindrical opening 60d and is urged toward the left end of the opening 60d by means of the spring 72 which is compressed between a spring seat 75 and the end plug 74. An O-ring 76 is mounted within an outer annular groove formed in the piston 70 and sealingly engages the inner cylindrical wall of the opening 60d. A rubber boot 78 is secured to the plug 74 and projects into the opening 60d, and is provided to accommodate air pressure changes in the space to the right of the piston 70 as the piston 70 is moved to the right.

The accumulator assembly also includes an actuating plunger 80 (corresponding to the plunger 28a of FIG. 1) which is slidably mounted within the smaller cylindrical opening 60e and is retained therein by means of a plug 82 threaded into the outer end of the opening 60e. The inner end of the plunger 80 extends through a cylindrical opening 70b formed in the end wall of the piston 70 and has an innermost end 80a formed in a generally semi-spherical manner which extends into a cup-shaped portion of the spring seat 75. An O-ring seal 81 is provided within the cylindrical opening 70b and sealingly engages the outer surface of the plunger 80.

The plug 82 is provided with a transverse passageway 82a which communicates with a passageway 83 formed in the valve body 60 and connected directly to the inlet 61 to receive master cylinder fluid pressure from the line 18b through a filter 84. In addition, the plug 82 is provided with an axially extending passageway 82b which connects the passageway 82a to an outer end face 80b of the plunger. The passageway 82b is provided with a restriction 82c to limit fluid flow therethrough. The outer end face 80b of the plunger is provided with a cylindrical opening having a seal 85 mounted therein. When the accumulator spring 72 is extended as shown in FIG. 2, the outer end face 80b of the plunger 80 is urged against the inner face of the plug 82 to cause the seal 85 to sealingly engage the end plug 82 around the entire periphery of the outlet end of the passageway 82b.

Figure 3:
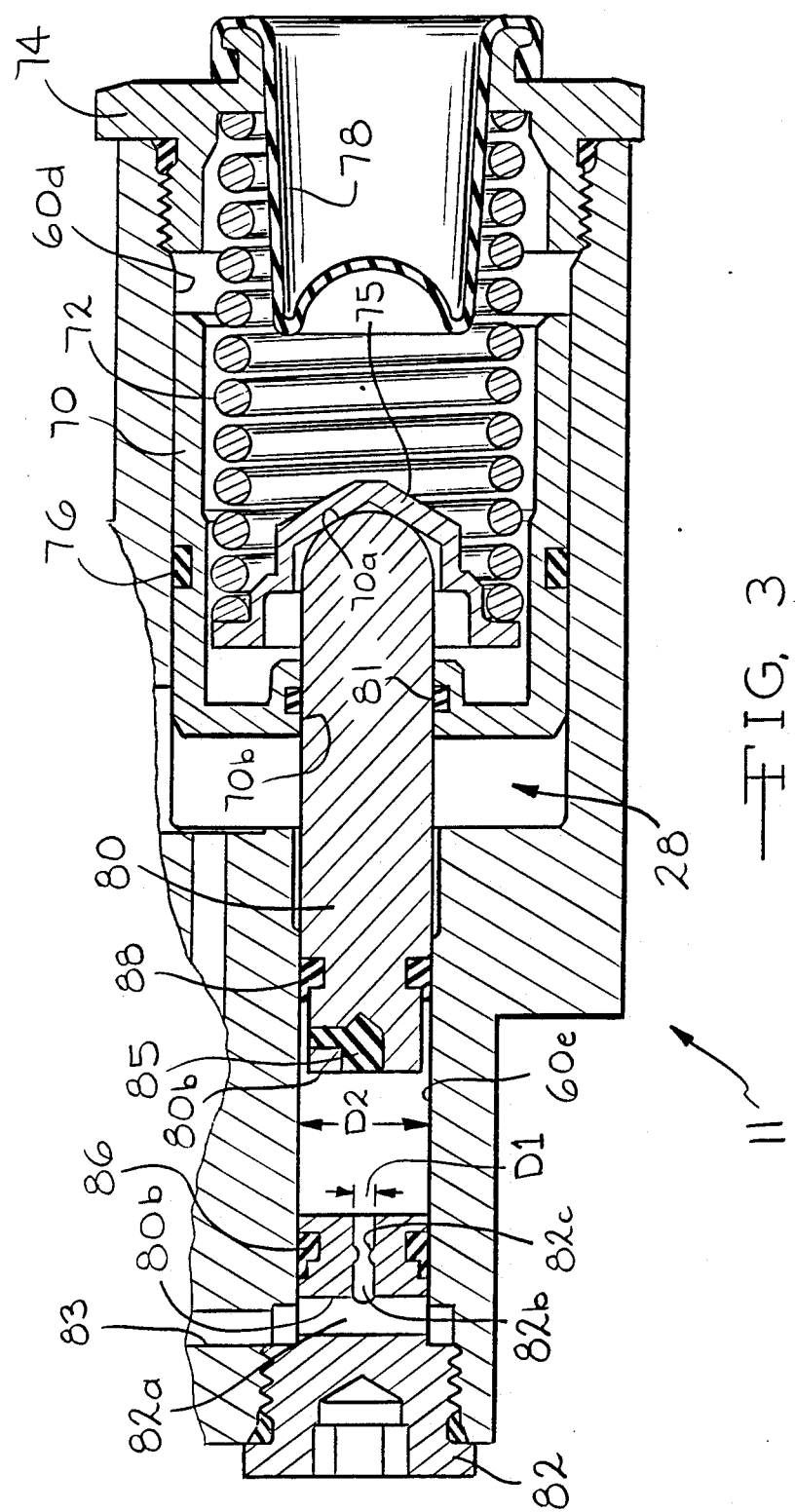
FIG. 3 is a fragmentary sectional view, similar to FIG. 2, but showing the relative positions of the accumulator components after fluid has been introduced into the accumulator reservoir.

The outlet end of the passageway 82b is sized of a diameter D1 (shown in FIG. 3) such that, during normal braking operation, the fluid pressure exerted on the seal 85 is insufficient to axially shift the plunger 80 and compress the spring 72. Thus, in these circumstances, the spring 72 will be extended and will continue to maintain the plunger 80 in its leftmost position, at which point the accumulator reservoir is at minimum volume. In this situation, the end face of the piston 70 will be slightly spaced from the inner end wall of the reservoir by a distance L, as shown in FIG. 2. However, once the brake system has entered the anti-lock mode and has caused fluid pressure to be dumped into the accumulator reservoir 28, the piston 70 will begin to move toward the right with the spring seat 75, and will begin to compress the spring 72. At this point, the spring seat 75 will no longer force the plunger 80 against the plug 82. The fluid pressure exerted on the plunger 80 is then sufficient to shift the plunger 80 axially toward the right to disengage the seal 85 from the end face of the plug 82. At this point, the entire end face 80b of the plunger 80, having a diameter D2 as shown in FIG. 3, will be exposed to the master cylinder fluid pressure. With this additional area, sufficient additional force is exerted on the plunger 80 to compress the spring 72, as shown in FIG. 3, such that the spring will exert no axial force on the piston 70. Thus, the piston is free to shift to the right as fluid is introduced into the reservoir 28, and the fluid contained in the reservoir will be maintained at or near zero pressure.

When the brake pedal is released, fluid pressure in the line 18b is no longer sufficient to overcome the force exerted by the spring 72, and the spring will urge the plunger 80 and the piston 70 back to their unactuated positions shown in FIG. 2. This causes the fluid in the accumulator reservoir 28 to be returned to the brake system via the check valve (shown in FIG. 2 as a one way lip seal 29a), while the fluid used to shift the plunger 80 is returned through the passageway 82b.

An annular lip seal 86 is located around the inner end of the plug 82 and provides a path, in addition to the passageway 82b, for returning fluid to the passageway 82a when the plunger 80 is moved from its actuated position (shown in FIG. 3) to its unactuated position (shown in FIG. 2). When the plunger is in the unactuated position, and pressurized fluid is present in the passageway 82a, the fluid will exert a force on the seal 86 which tends to compress the seal 86 in an axial direction toward the plunger 80. This causes the fluid located in an annular space 87 about the outer end of the plunger 80 to become pressurized. To reduce the axial force exerted on the plunger 80 by the fluid in the annular space, a second lip seal 88 is located around the outer end of the plunger 80. Thus, when the seal 86 is compressed, the seal 88 will be compressed in a similar manner, thereby reducing the effect of any axial force exerted by the fluid in the space 87 on the plunger 80.

The accumulator assembly of the present invention has been explained and illustrated in its preferred embodiment. However, it will be appreciated that various modifications may be made to the accumulator assembly without departing from the spirit of the present invention. For example, while the preferred embodiment of the invention utilizes fluid pressure supplied by master cylinder as a means for axially shifting the plunger to compress the accumulator spring, other means could be used. Also, while the accumulator has been described herein for use with a pumpless anti-lock system, it will be appreciated that the accumulator can be used in a more conventional, pumped anti-lock system.

What is claimed is:

1. In a vehicle anti-lock brake system adapted to control the fluid pressure in a brake circuit to at least one selected wheel brake to correct an impending lock-up condition of an associated wheel, the brake system including a valve means connected between the selected wheel brake and a fluid accumulator, the valve means being selectively controlled during anti-lock operation of the brake system to supply brake fluid to the fluid accumulator for reducing fluid pressure to the selected wheel brake, the fluid accumulator comprising:
   a reservoir having an opening for receiving and retaining brake fluid during anti-lock operation;
   means for maintaining fluid pressure of said brake fluid within said reservoir at a first predetermined pressure during anti-lock operation; and
   means operative only when the brake system is not under anti-lock operation for applying a second predetermined pressure greater than said first predetermined pressure to said brake fluid within said reservoir to enable said brake fluid to flow through said opening and be returned to the brake circuit.

2. The anti-lock brake system according to claim 1 wherein said first predetermined pressure is substantially zero pressure.

3. The anti-lock brake system according to claim 1 wherein the valve means includes a normally open isolation valve connected between a vehicle master cylinder and the selected wheel brake, and a normally closed dump valve connected between the selected wheel brake and said reservoir, and a control means operable to detect an impending lock-up condition of an associated wheel and to operate said isolation valve and said dump valve to correct the impending lock-up condition, the dump valve being selectively opened during anti-lock operation to supply brake fluid to said reservoir for reducing fluid pressure to the selected wheel brake.

4. The anti-lock brake system according to claim 1 wherein said means for maintaining is operative to maintain said first predetermined pressure only during anti-lock operation of the brake system.

5. The anti-lock brake system according to claim 1 wherein said means for applying applies said second predetermined pressure after anti-lock operation of the brake system.

6. An accumulator assembly for use in a vehicle anti-lock brake system comprising:
a housing defining a cavity;
a piston slidably mounted within said cavity and cooperating with said cavity for defining a reservoir for receiving and temporarily storing brake fluid during operation of the anti-lock brake system;
spring means coupled to said piston for biasing said piston in a direction which exerts a predetermined force on said piston to maintain fluid stored in said reservoir at a predetermined pressure; and
means connected to said spring means and operative to reduce said force exerted on said piston to reduce the pressure of the fluid stored in said reservoir during at least a portion of the operation of the anti-lock brake system.

7. The anti-lock brake system according to claim 6 wherein said means connected to said spring means reduces the pressure to substantially zero pressure.

8. The brake system according to claim 6 wherein the vehicle anti-lock brake system includes a normally open isolation valve connected between a vehicle master cylinder and the selected wheel brake, and a normally closed dump valve connected between the selected wheel brake and said reservoir, and a control means operable to detect an impending lock-up condition of an associated wheel and to operate said isolation valve and said dump valve to correct the impending lock-up condition, said dump valve being selectively opened during anti-lock operation to supply brake fluid to said reservoir for reducing pressure to the selected wheel brake.

9. The anti-lock brake system according to claim 6 wherein said spring means exerts said predetermined force after anti-lock operation of the brake system.

10. An accumulator assembly for use in a vehicle anti-lock brake system comprising;
a housing defining a cavity;
a piston slidably mounted within said cavity and cooperating with said cavity for defining a reservoir for receiving and temporarily storing brake fluid during operation of the anti-lock system;
spring means coupled to said piston for biasing said piston in a direction which exerts a predetermined force on said piston to maintain fluid stored in said reservoir at a predetermined pressure;
plunger means connected to said spring means and operative to compress said spring means such that said spring means exerts no force on said piston; and
means for moving said plunger to compress said spring means.

11. The accumulator assembly according to claim 10 wherein the vehicle anti-lock brake system includes a normally open isolation valve connected between a vehicle master cylinder and a selected wheel brake, and a normally closed dump valve connected between the selected wheel brake and said reservoir, and a control means operable to detect an impending lock-up condition of an associated wheel and to operate said isolation valve and said dump valve to control the fluid pressure to correct the impending lock-up condition, said dump valve being selectively opened during anti-lock operation to supply brake fluid to said reservoir for reducing fluid pressure to the selected wheel brake.

12. The accumulator assembly according to claim 11 wherein said plunger means is shiftable between an unactuated position wherein said spring means exerts said predetermined force on said piston and an actuated position wherein said spring means is compressed to exert no force on said piston.

13. The accumulator assembly according to claim 12 wherein said plunger means is hydraulically shifted to said actuated position.

14. The accumulator assembly according to claim 13 wherein said plunger means is shifted by means of presurized brake fluid.

15. The accumulator assembly according to claim 14 wherein said housing includes a passageway for supplying brake fluid to shift said plunger means, said passageway including a restriction for limiting fluid flow through said passageway.

16. The accumulator assembly according to claim 13 wherein said plunger means is shifted to said unactuated position by said spring means.

17. The accumulator assembly according to claim 12 wherein said plunger means is shifted to said actuated position only during anti-lock operation.

18. The accumulator assembly according to claim 17 wherein said plunger means is shifted to said actuated position after said dump valve has been opened to supply fluid to said reservoir.

* * * * *